United States Patent
Wu (10) Patent No.: US 8,253,687 B2
(45) Date of Patent: Aug. 28, 2012

(54) SLIM MOUSE

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 889 days.

(21) Appl. No.: 12/358,930

(22) Filed: Jan. 23, 2009

(65) Prior Publication Data
US 2010/0171701 A1 Jul. 8, 2010

(30) Foreign Application Priority Data

Jan. 5, 2009 (TW) .............................. 98100016 A (51) Int. Cl.
*G06F 3/033* (2006.01)
(52) U.S. Cl. ........ 345/163; 345/164; 345/165; 345/166; 345/156
(58) Field of Classification Search .......... 345/163–166, 345/156
See application file for complete search history.

(56) References Cited

U.S. PATENT DOCUMENTS

| 4,906,843 | A  | * | 3/1990 | Jones et al. | 250/221 |
|---|---|---|---|---|---|
| 2006/0007151 | A1 | * | 1/2006 | Ram | 345/163 |
| 2006/0256091 | A1 | * | 11/2006 | Hino | 345/173 |
| 2008/0266258 | A1 | * | 10/2008 | Chiang | 345/163 |

* cited by examiner

*Primary Examiner* — Alexander S Beck
*Assistant Examiner* — Jeffrey Steinberg
(74) *Attorney, Agent, or Firm* — Kirton McConkie; Evan R. Witt (57) ABSTRACT

A slim mouse includes a mouse body, a battery box case, a wheel function module, multiple click buttons, a PCMCIA connecting part and a connecting frame. The mouse body includes a first receiving part, a first body fillister, a second receiving part and a second body fillister. The connecting frame includes a first connecting arm, a first salient, a second connecting arm, a second salient, a first protrusion and a second protrusion. The first protrusion and the second protrusion are respectively inserted into the first body fillister and the second body fillister. By using the first protrusion and the second protrusion as a shaft, the connecting frame is rotatable with respect to the mouse body so as to change the operating mode of the slim mouse.

22 Claims, 5 Drawing Sheets

SLIM MOUSE

FIELD OF THE INVENTION

The present invention relates to a mouse, and more particularly to a slim mouse.

BACKGROUND OF THE INVENTION

Due to the amazing power of computer systems, computer systems are developed to have various functions. Input devices such as mouse devices, keyboards or a trackballs have been widely employed in a computer system for cursor control. Among these input devices, the mouse devices are the most prevailing because they are very easy-to-use. When a palm of the user's hand is supported on a mouse, the user may move the mouse to control movement of the cursor shown on the computer screen. In addition, by operating the click buttons of the mouse device, the user may select a desired item on the function menu of the browsing frame or execute a corresponding function.

In the early stage, the mouse has a left click button and a right click button. With increasing development of computers and their peripheral devices, today's mouse has an additional wheel for executing a vertical scrolling function. By rotating the wheel of the mouse forwardly or backwardly, the graphic-based window or the web page shown on the computer screen may be scrolled in the vertical direction so as to facilitate the user to browse web pages or documents. Nowadays, with the maturity of the mouse technology, the functions of the mouse are diversified. For example, the trends of designing the notebook computer and its peripheral device are toward minimization in order to facilitate portability and storage. For portability and storage, a slim mouse is correspondingly introduced to the market.

Figure 1:
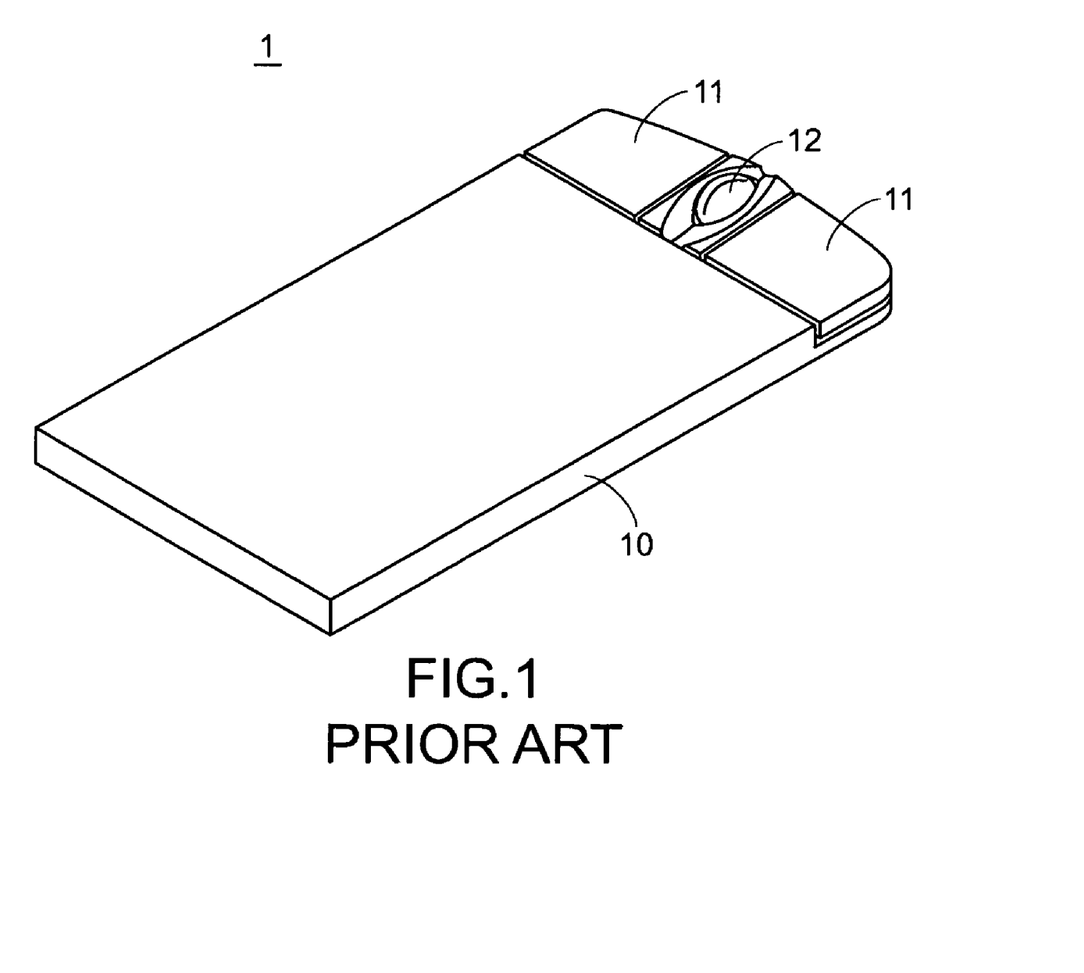
FIG. 1 is a schematic perspective view of a conventional slim mouse.

For reducing the thickness of the mouse, a slim mouse is disclosed. FIG. 1 is a schematic perspective view of a conventional slim mouse. As shown in FIG. 1, the slim mouse 1 comprises a mouse body 10, multiple click buttons 11 and a scroll wheel 12. By operating the click buttons 11, the user may select a desired item on the function menu of the browsing frame or execute a corresponding function. A portion of the scroll wheel 12 is protruded from the outer surface of mouse body 10 such that the scroll wheel 12 can be rotated by a user's finger. Since the mouse body 10 is slim and flat, the slim mouse 1 is advantageous for portability and easy storage. The mouse body 10, however, still has some drawbacks. For example, since the palm of the user's hand fails to be well supported on the slim and flat mouse body 10 of the slim mouse 1, the slim mouse 1 can not meet the ergonomic demand. As a consequence, when the slim mouse 1 has been used for a long term, the user may feel very tired because the palm of the user's hand is always hung in the air.

Therefore, there is a need of providing a slim mouse so as to obviate the drawbacks encountered from the prior art.

SUMMARY OF THE INVENTION

It is an object of the present invention to provide a slim mouse capable of meeting the ergonomic demand.

In accordance with an aspect of the present invention, there is provided a slim mouse communicable with a computer. The slim mouse includes a mouse body, a battery box case and a connecting frame. The mouse body includes a first receiving part, a first body fillister, a second receiving part and a second body fillister. The first receiving part and the first body fillister are formed in a first side surface of the mouse body. The second receiving part and the second body fillister are formed in a second side surface of the mouse body. The battery box case contains a battery box. A battery is accommodated within the battery box for providing electricity. The connecting frame is connected with the battery box case and the mouse body. The connecting frame is rotatable with respect to the mouse body to switch an operating mode of the slim mouse. The connecting frame includes a first connecting arm, a first salient, a second connecting arm, a second salient, a first protrusion and a second protrusion. The first connecting arm is disposed at a first side of the connecting frame. The first salient is disposed on the first connecting arm. The second connecting arm is disposed at a second side of the connecting frame. The second salient is disposed on the second connecting arm. The first protrusion is disposed on the first connecting arm and inserted into the first body fillister. The second protrusion is disposed on the second connecting arm and inserted into the second body fillister such that the connecting frame is rotatable with respect to the mouse body by using the first protrusion and the second protrusion as a shaft. When the connecting frame is substantially coplanar with the mouse body, the first salient and the second salient are respectively accommodated within the first receiving part and the second receiving part such that the slim mouse is operated in a charging mode. When an included angle is formed between the connecting frame and the mouse body by rotating the connecting frame, the first salient and the second salient are respectively detached from the first receiving part and the second receiving part such that the slim mouse is operated in a mouse mode.

In an embodiment, the slim mouse further includes a conductive wire, which is connected to the battery box and the mouse body.

In an embodiment, the battery box case further includes an extension part, and the first protrusion further includes a perforation. A first terminal of the conducting wire is connected to the battery box, the conducting wire is penetrated through the extension part, and a second terminal of the conducting wire is stretched out of the perforation and connected to the mouse body, so that the battery box and the mouse body are electrically connected with each other.

In an embodiment, the slim mouse further includes a wheel function module for providing a wheel function.

In an embodiment, the wheel function module is an optical finger navigation module.

In an embodiment, the slim mouse further includes a wireless signal emitter, which is disposed within the mouse body for generating a wireless signal.

In an embodiment, a wireless signal receiver is connected to the computer for receiving the wireless signal from the wireless signal emitter, so that the slim mouse is communicated with the computer via the wireless signal.

In an embodiment, the mouse body further includes a receiver storing part for storing therein the wireless signal receiver.

In an embodiment, the slim mouse further includes multiple buttons, which are disposed on the mouse body.

In an embodiment, the slim mouse further includes a PCMCIA connecting part disposed at an end of the mouse body. When the slim mouse is operated in the charging mode and the PCMCIA connecting part is connected to a PCMCIA slot of the computer, the electric energy of the computer is transmitted to the slim mouse through the PCMCIA connecting part so as to charge the battery.

In an embodiment, the computer is a notebook computer.

In accordance with another aspect of the present invention, there is provided a slim mouse communicable with a computer. The slim mouse includes a mouse body, a battery box case and a connecting frame. The mouse body includes a first salient, a first protrusion, a second salient and a second protrusion. The first salient and the first protrusion are formed on a first side surface of the mouse body. The second salient and the second protrusion are formed on a second side surface of the mouse body. The battery box case contains a battery box. A battery is accommodated within the battery box for providing electricity. The connecting frame is connected with the battery box case and the mouse body. The connecting frame is rotatable with respect to the mouse body to switch an operating mode of the slim mouse. The connecting frame includes a first connecting arm, a first receiving part, a second connecting arm, a second receiving part, a first opening and a second opening. The first connecting arm is disposed at a first side of the connecting frame. The first receiving part is formed in the first connecting arm. The second connecting arm is disposed at a second side of the connecting frame. The second receiving part is formed in the second connecting arm. The first opening is formed in the first connecting arm and inserted by the first protrusion. The second opening is formed in the second connecting arm and inserted by the second protrusion such that the connecting frame is rotatable with respect to the mouse body by using the first protrusion and the second protrusion as a shaft. When the connecting frame is substantially coplanar with the mouse body, the first salient and the second salient are respectively accommodated within the first receiving part and the second receiving part such that the slim mouse is operated in a charging mode. When an included angle is formed between the connecting frame and the mouse body by rotating the connecting frame, the first salient and the second salient are respectively detached from the first receiving part and the second receiving part such that the slim mouse is operated in a mouse mode.

In an embodiment, the slim mouse further includes a conductive wire, which is connected to the battery box and the mouse body.

In an embodiment, the battery box case further includes an extension part, and the first protrusion further includes a perforation. A first terminal of the conducting wire is connected to the battery box, the conducting wire is penetrated through the extension part, and a second terminal of the conducting wire is stretched out of the perforation and connected to the mouse body, so that the battery box and the mouse body are electrically connected with each other.

In an embodiment, the slim mouse further includes a wheel function module for providing a wheel function.

In an embodiment, the wheel function module is an optical finger navigation module.

In an embodiment, the slim mouse further includes a wireless signal emitter, which is disposed within the mouse body for generating a wireless signal.

In an embodiment, a wireless signal receiver is connected to the computer for receiving the wireless signal from the wireless signal emitter, so that the slim mouse is communicated with the computer via the wireless signal.

In an embodiment, the mouse body further includes a receiver storing part for storing therein the wireless signal receiver.

In an embodiment, the slim mouse further includes multiple buttons, which are disposed on the mouse body.

In an embodiment, the slim mouse further includes a PCMCIA connecting part disposed at an end of the mouse body. When the slim mouse is operated in the charging mode and the PCMCIA connecting part is connected to a PCMCIA slot of the computer, the electric energy of the computer is transmitted to the slim mouse through the PCMCIA connecting part so as to charge the battery.

In an embodiment, the computer is a notebook computer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Since the functions of the notebook computer become more and more powerful, the memory capacity of the notebook computer needs to be increased. For expanding the memory capacity of the notebook computer, the Personal Computer Memory Card International Association (PCMCIA) has developed standard credit card-sized PCMCIA cards. Most notebook computers have built-in PCMCIA slots for PCMCIA cards. Nowadays, a variety of memory cards such as modem cards, networks or USB port expansion devices can be inserted into the built-in PCMCIA slots of the notebook computers for implementing corresponding functions. As a consequence, PCMCIA cards become essential peripheral devices of notebook computers.

The present invention provides a slim mouse that meets the ergonomic demand and conforms to the specifications of the PCMCIA slot.

Figure 2:
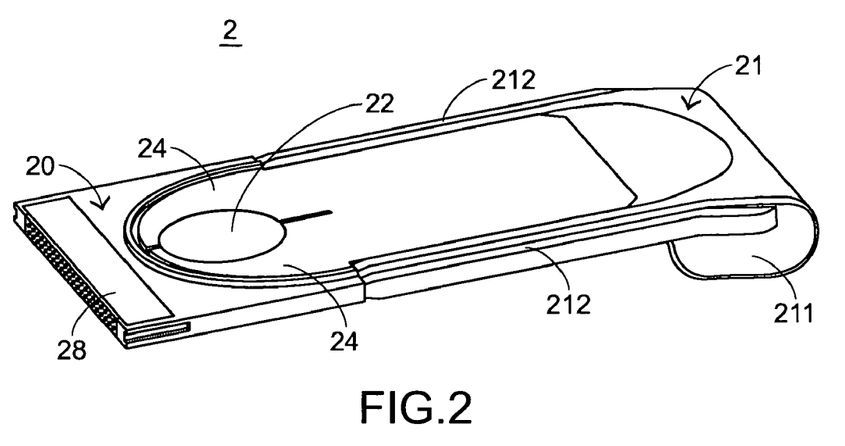
FIG. 2 is a schematic perspective view illustrating a slim mouse according to a first preferred embodiment of the present invention.
Figure 3:
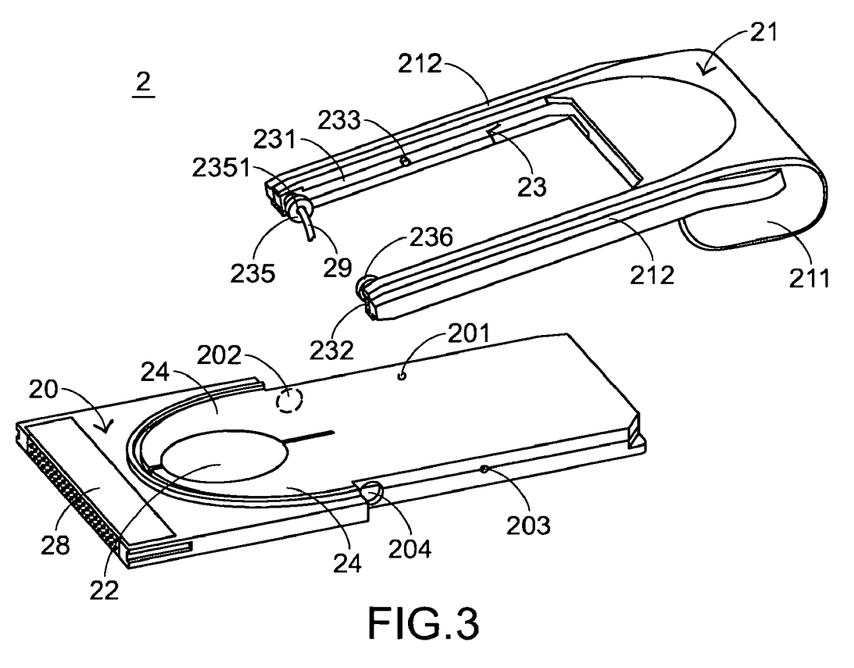
FIG. 3 is a schematic exploded view illustrating the connection between the mouse body and the connecting frame of the slim mouse according to the first preferred embodiment of the present invention.
Figure 4:
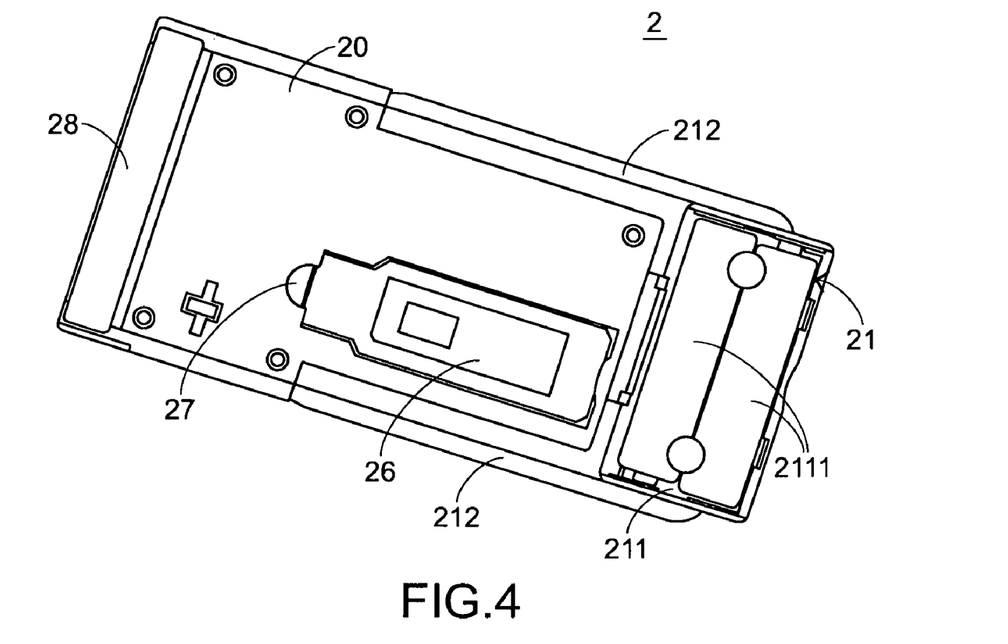
FIG. 4 is a schematic backside view of the slim mouse according to the first preferred embodiment of the present invention.

FIG. 2 is a schematic perspective view illustrating a slim mouse according to a first preferred embodiment of the present invention. As shown in FIG. 2, the slim mouse 2 principally comprises a mouse body 20, a battery box case 21, a wheel function module 22, multiple click buttons 24, a PCMCIA connecting part 28 and a connecting frame 23 (as shown in FIG. 3). The click buttons 24 are disposed on the mouse body 20. By operating one of the click buttons 24 of the slim mouse 2, the user may select a desired item on the function menu of the browsing frame or execute a corresponding function. The wheel function module 22 is disposed on the mouse body 20 for providing a wheel function. An example of the wheel function module 22 is an optical finger navigation (OFN) module. The use of the optical finger navigation module 22 can replace the scroll wheel of a conventional wheel mouse so as to scroll the browsing frame shown on the computer screen. The PCMCIA connecting part 28 is disposed at a first end of the mouse body 20 to be connected with a computer. The way of connecting the PCMCIA connecting part 28 and a computer will be illustrated later. The battery box case 21 is disposed at a second end of the mouse body 20, wherein the second end is opposed to the first end. The battery box case 21 contains a battery box 211 for accommodating a battery 2111 (as shown in FIG. 4). The battery can provide electricity required for operating the slim mouse 2. An example of the battery 2111 is a rechargeable battery or secondary battery.

The battery box case 21 is connected to the mouse body 20 through the connecting frame 23. The relation between the battery box case 21, the connecting frame 23 and the mouse body 20 will be illustrated with reference to FIG. 3. FIG. 3 is a schematic exploded view illustrating the connection between the mouse body and the connecting frame of the slim mouse according to the first preferred embodiment of the present invention. The connecting frame 23 is connected with the battery box case 21 by for example screwing means. As shown in FIG. 3, the mouse body 20 has a first receiving part 201, a first body fillister 202, a second receiving part 203 and a second body fillister 204. The first receiving part 201 and the first body fillister 202 are formed in a first side surface of the mouse body 20. The second receiving part 203 and the second body fillister 204 are formed in a second side surface of the mouse body 20.

Please refer to FIG. 3 again. The connecting frame 23 includes a first connecting arm 231, a first salient 233, a second connecting arm 232, a second salient (not shown), a first protrusion 235 and a second protrusion 236. The first connecting arm 231 and the second connecting arm 232 are respectively disposed at bilateral sides of the connecting frame 23. The first protrusion 235 and the first salient 233 are disposed on the first connecting arm 231. The second protrusion 236 and the second salient are disposed on the second connecting arm 232. The first protrusion 235 and the second protrusion 236 are inserted into the first body fillister 202 and the second body fillister 204, respectively. After the connecting frame 23 is connected with the battery box case 21, the first protrusion 235 and the second protrusion 236 are respectively inserted into the first body fillister 202 and the second body fillister 204 such that battery box case 21 is connected with the mouse body 20 through the connecting frame 23 (as shown in FIG. 2).

FIG. 4 is a schematic backside view of the slim mouse according to the first preferred embodiment of the present invention. The bottom of the slim mouse 2 has a receiver storing part 27 for storing therein a wireless signal receiver 26. As shown in FIG. 4, the battery 2111 is accommodated within the battery box 211 of the battery box case 21. The process of making electrical connection between the battery box 211 and the mouse body 20 will be illustrated with reference to FIG. 3 and FIG. 4. The first protrusion 235 of the connecting frame 23 has a perforation 2351. The battery box case 21 further comprises an extension part 212. In addition, the slim mouse 2 has a conducting wire 29. After a first terminal (not shown) of the conducting wire 29 is connected to the battery box 211, the conducting wire 29 is penetrated through the extension part 212 and then the second terminal of the conducting wire 29 is stretched out of the perforation 2351 of the first protrusion 235. After the first protrusion 235 is inserted into the first body fillister 202, the second terminal of conducting wire 29 is connected to a circuit board (not shown) within the mouse body 20. Meanwhile, the battery box 211 and the mouse body 20 are electrically connected with each other, and thus the electricity of the battery 2111 in the battery box 211 can be transmitted to the mouse body 20 through the conducting wire 29.

Figure 7:
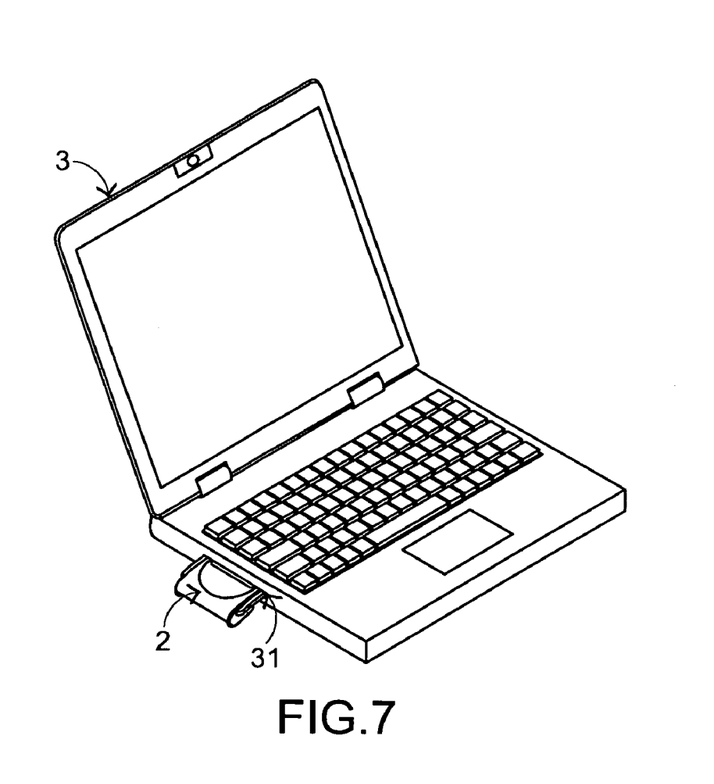
FIG. 7 a schematic perspective view illustrating the slim mouse in a charging mode according to the first preferred embodiment of the present invention.

Please refer to FIG. 7. FIG. 7 a schematic perspective view illustrating the slim mouse in a charging mode according to the first preferred embodiment of the present invention. For charging the slim mouse 2, the connecting frame 23 should be first adjusted to be substantially coplanar with the mouse body 20 such that the slim mouse 2 is switched to a charging mode. Next, the slim mouse 2 in the charging mode is inserted into the PCMCIA slot 31 of the computer 3 such that the PCMCIA connecting part 28 at the first end of the mouse body 20 is electrically connected with the PCMCIA slot 31 of the computer 3. As such, the electric energy of the computer 3 is transmitted to the mouse body 20 of the slim mouse 2 through the PCMCIA slot 31 and the PCMCIA connecting part 28, and then the electric energy is transmitted to the battery box case 21 through the conducting wire 29 so as to charge the battery 2111.

By the way, the first protrusion 235 and the second protrusion 236 are respectively inserted into the first body fillister 202 and the second body fillister 204 of the mouse body 20. As such, the connecting frame 23 is rotatable with respect to the mouse body 20 to switch an operating mode of the slim mouse 2. When the connecting frame 23 is substantially coplanar with the mouse body 20, the first salient 233 and the second salient are respectively accommodated within the first receiving part 201 and the second receiving part 203 such that the slim mouse 2 is operated in the charging mode (as shown in FIG. 2).

Figure 5:
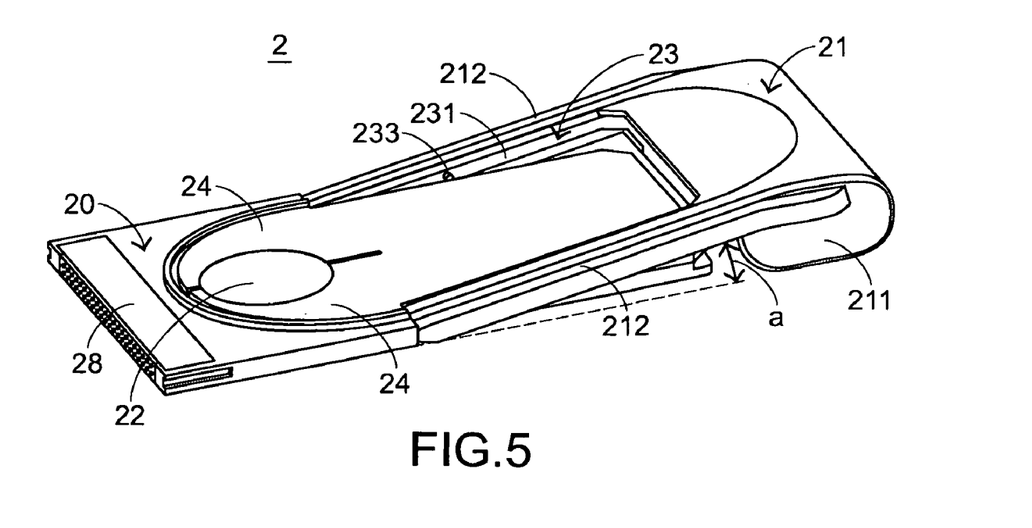
FIG. 5 a schematic perspective view illustrating the slim mouse in a mouse mode according to the first preferred embodiment of the present invention.

After the charging operation of the slim mouse 2 is completed, the slim mouse 2 may be withdrawn out of the PCMCIA slot 31 of the computer 3. For switching the operating mode of the slim mouse 2 from the charging mode to a mouse mode, the connecting frame 23 is rotated with respect to the mouse body 20 such that an included angle "a" is formed between the connecting frame 23 and the mouse body 20. Meanwhile, the first salient 233 and the second salient are respectively detached from the first receiving part 201 and the second receiving part 203 such that the slim mouse 2 is operated in the mouse mode (as shown in FIG. 5). Since there is the included angle "a" between the connecting frame 23 and the mouse body 20, the slim mouse 2 has a cambered surface for facilitate supporting the palm of the user's hand. In other words, the slim mouse 2 in the mouse mode can meet the ergonomic demand.

Figure 6:
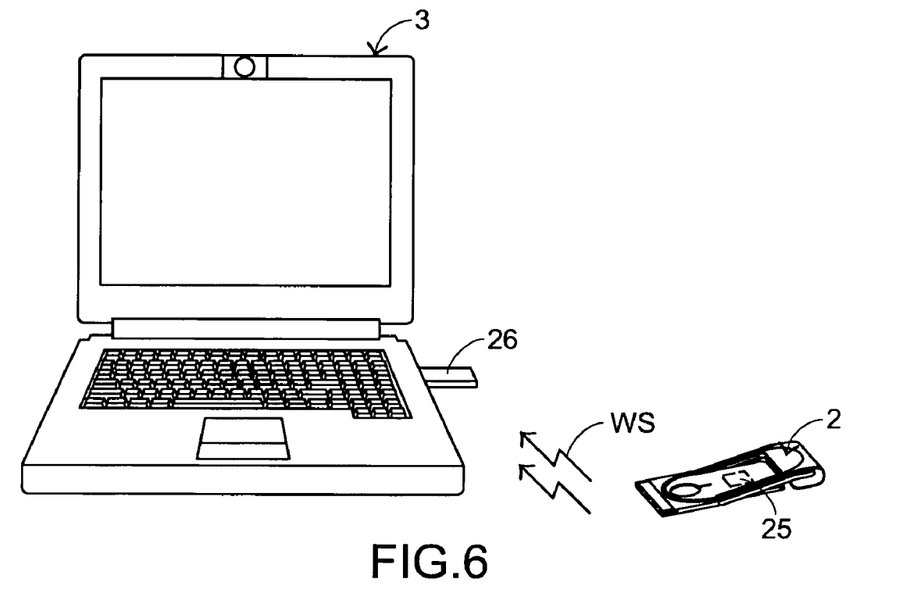
FIG. 6 is a schematic view illustrating the slim mouse of the present invention applied to a computer.

FIG. 6 is a schematic view illustrating the slim mouse of the present invention applied to a computer. As shown in FIG. 6, the slim mouse 2 is not directly connected to the computer 3. In particular, the slim mouse 2 is communicated with the computer 3 according to a wireless transmission technology. The wireless mouse 2 further includes a wireless signal emitter 25, which is disposed within the mouse body 20, for generating a wireless signal WS. Before operating the slim mouse 2, the wireless signal receiver 26 needs to be inserted into a connecting port of the computer 3. When the wireless signal WS emitted by the wireless signal emitter 25, the slim mouse 2 is communicated with the computer 3.

Figure 8:
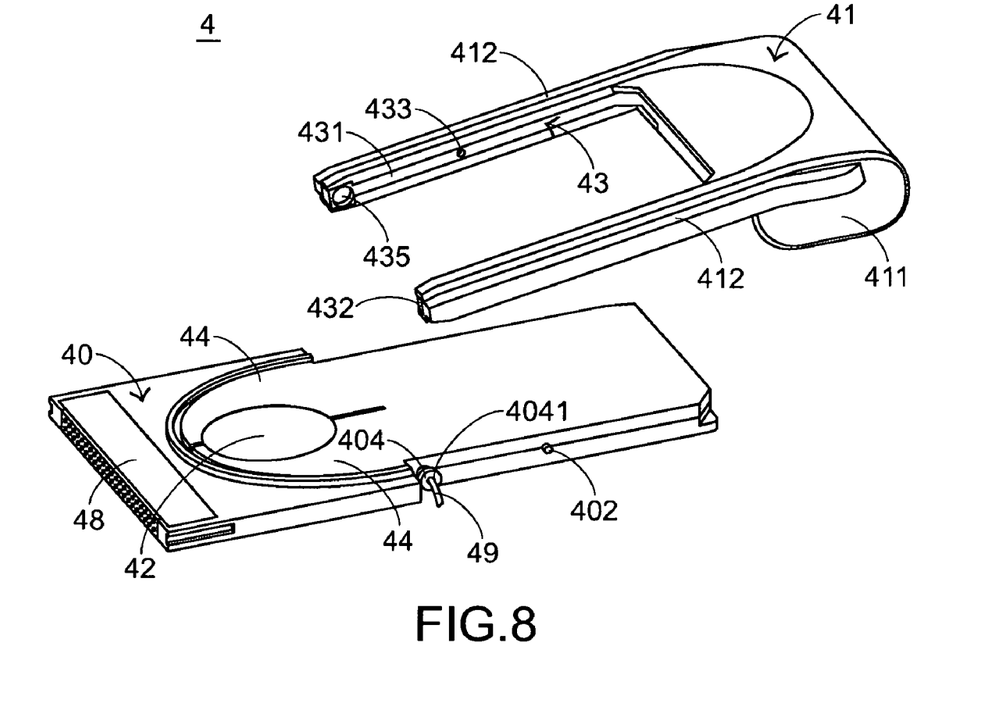
FIG. 8 is a schematic exploded view illustrating the connection between the mouse body and the connecting frame of the slim mouse according to a second preferred embodiment of the present invention.

FIG. 8 is a schematic exploded view illustrating the connection between the mouse body and the connecting frame of the slim mouse according to a second preferred embodiment of the present invention. After the slim mouse 4 is assembled, the outward view of FIG. 8 is substantially the same as that of the first preferred embodiment of the present invention but some components inside the slim mouse of FIG. 8 is distinguished. As shown in FIG. 8, the slim mouse 4 principally comprises a mouse body 40, a battery box case 41, a wheel function module 42, multiple click buttons 44, a PCMCIA connecting part 48 and a connecting frame 43. The functions of the wheel function module 42, the click buttons 44 and the PCMCIA connecting part 48 are similar to those illustrated in the first preferred embodiment, and are not redundantly described herein.

In comparison with the first preferred embodiment, the mouse body 40 and the connecting frame 43 are distinguishable. As shown in FIG. 8, the mouse body 40 comprises a first salient (not shown), a first protrusion (not shown), a second salient 402 and a second protrusion 404. The first salient and the first protrusion are formed on a first side surface of the mouse body 40. The second salient 402 and the second protrusion 404 are formed on a second side surface of the mouse body 40. The connecting frame 43 includes a first connecting arm 431, a second connecting arm 432, a first receiving part 433, a second receiving part (not shown), a first opening 435 and a second opening (not shown). The first receiving part 433 and the first opening 435 are formed in the first connecting arm 431. The second receiving part and the second opening are formed in the second connecting arm 432. The first protrusion and the second protrusion 404 are respectively inserted into the first opening 435 and a second opening. As such, the connecting frame 43 is rotatable with respect to the mouse body 40 by using the first protrusion and the second protrusion 404 as a shaft. When the first salient and the second salient 402 are respectively accommodated within the first receiving part 433 and the second receiving part and the connecting frame 43 is substantially coplanar with the mouse body 40, the slim mouse 4 is operated in a charging mode. Whereas, when the connecting frame 43 is rotated with respect to the mouse body 40 and an included angle is formed between the connecting frame 43 and the mouse body 40, the first salient and the second salient 402 are respectively detached from the first receiving part 433 and the second receiving part such that the slim mouse 4 is operated in the mouse mode. In addition, the slim mouse 4 has a conducting wire 49 for electrically connecting the battery box 411 and the mouse body 40. The second protrusion 404 of the mouse body 40 has a perforation 4041 and the battery box case 41 further comprises an extension part 412. After a first terminal (not shown) of the conducting wire 49 is connected to the battery box 411, the conducting wire 49 is penetrated through the extension part 412 and then the second terminal of the conducting wire 49 is stretched out of the perforation 4041. After the second protrusion 404 is inserted into the second opening, the second terminal of conducting wire 49 is connected to a circuit board (not shown) within the mouse body 40. Meanwhile, the battery box 411 and the mouse body 40 are electrically connected with each other, and thus the electricity of the battery 4111 in the battery box 411 can be transmitted to the mouse body 40 through the conducting wire 49.

From the above embodiment, the slim mouse is adjusted to have a cambered surface for facilitate supporting the palm of the user's hand when the slim mouse is operated in the mouse mode. Moreover, the battery box case is connected to the mouse body through the connecting frame, and the battery box case or the connecting frame is rotatable with respect to the mouse body. When the connecting frame is substantially coplanar with the mouse body, the slim mouse a flat shape for facilitating being inserted into the PCMCIA slot of a computer. Therefore, the slim mouse of the present invention is also advantageous for portability and easy storage. Moreover, when the slim mouse of the present invention is inserted into the PCMCIA slot of a computer, the electric energy of the computer can be transmitted to the slim mouse to charge the battery. In other words, the slim mouse of the present invention is capable of meeting the ergonomic demand and having a thin thickness, thereby obviating the drawbacks encountered from the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A slim mouse communicable with a computer, said slim mouse comprising:
    a mouse body comprising a first receiving part, a first body fillister, a second receiving part and a second body fillister, wherein said first receiving part and said first body fillister are formed in a first side surface of said mouse body, and said second receiving part and said second body fillister are formed in a second side surface of said mouse body;
    a battery box case containing a battery box, wherein a battery is accommodated within said battery box for providing electricity; and
    a connecting frame connected with said battery box case and said mouse body and rotatable with respect to said mouse body to switch an operating mode of said slim mouse, wherein said connecting frame comprises:
        a first connecting arm disposed at a first side of said connecting frame;
        a first salient disposed on said first connecting arm;
        a second connecting arm disposed at a second side of said connecting frame;
        a second salient disposed on said second connecting arm;
        a first protrusion disposed on said first connecting arm and inserted into said first body fillister; and
        a second protrusion disposed on said second connecting arm and inserted into said second body fillister such that said connecting frame is rotatable with respect to said mouse body by using said first protrusion and said second protrusion as a shaft,
    wherein when said connecting frame is substantially coplanar with said mouse body, said first salient and said second salient are respectively accommodated within said first receiving part and said second receiving part such that said slim mouse is operated in a charging mode, and when an inclined angle is formed between said connecting frame and said mouse body by rotating said connecting frame, said first salient and said second salient are respectively detached from said first receiving part and said second receiving part such that said slim mouse is operated in a mouse mode.

2. The slim mouse according to claim 1 further comprising a conductive wire, which is connected to said battery box and said mouse body.

3. The slim mouse according to claim 1 wherein said battery box case further comprises an extension part, and said first protrusion further comprises a perforation, wherein a first terminal of said conducting wire is connected to said battery box, said conducting wire is penetrated through the extension part, and a second terminal of said conducting wire is stretched out of said perforation and connected to said mouse body, so that said battery box and said mouse body are electrically connected with each other.

4. The slim mouse according to claim 1 further comprising a wheel function module for providing a wheel function.

5. The slim mouse according to claim 4 wherein said wheel function module is an optical finger navigation module.

6. The slim mouse according to claim 1 further comprising a wireless signal emitter, which is disposed within said mouse body for generating a wireless signal.

7. The slim mouse according to claim 6 wherein a wireless signal receiver is connected to said computer for receiving said wireless signal from said wireless signal emitter, so that said slim mouse is communicated with said computer via said wireless signal.

8. The slim mouse according to claim 7 wherein said mouse body further comprises a receiver storing part for storing therein said wireless signal receiver.

9. The slim mouse according to claim 1 further comprising multiple buttons, which are disposed on said mouse body.

10. The slim mouse according to claim 1 further comprising a PCMCIA connecting part disposed at an end of said mouse body, wherein when said slim mouse is operated in said charging mode and said PCMCIA connecting part is connected to a PCMCIA slot of said computer, the electric energy of said computer is transmitted to said slim mouse through said PCMCIA connecting part so as to charge said battery.

11. The slim mouse according to claim 1 wherein said computer is a notebook computer.

12. A slim mouse communicable with a computer, said slim mouse comprising:
  a mouse body comprising a first salient, a first protrusion, a second salient and a second protrusion, wherein said first salient and said first protrusion are formed on a first side surface of said mouse body, and said second salient and said second protrusion are formed on a second side surface of said mouse body;
  a battery box case containing a battery box, wherein a battery is accommodated within said battery box for providing electricity; and
  a connecting frame connected with said battery box case and said mouse body and rotatable with respect to said mouse body to switch an operating mode of said slim mouse, wherein said connecting frame comprises:
    a first connecting arm disposed at a first side of said connecting frame;
    a first receiving part formed in said first connecting arm;
    a second connecting arm disposed at a second side of said connecting frame;
    a second receiving part formed in said second connecting arm;
    a first opening formed in said first connecting arm and inserted by said first protrusion; and
    a second opening formed in said second connecting arm and inserted by said second protrusion such that said connecting frame is rotatable with respect to said mouse body by using said first protrusion and said second protrusion as a shaft,
  wherein when said connecting frame is substantially coplanar with said mouse body, said first salient and said second salient are respectively accommodated within said first receiving part and said second receiving part such that said slim mouse is operated in a charging mode, and when an inclined angle is formed between said connecting frame and said mouse body by rotating said connecting frame, said first salient and said second salient are respectively detached from said first receiving part and said second receiving part such that said slim mouse is operated in a mouse mode.

13. The slim mouse according to claim 12 further comprising a conductive wire, which is connected to said battery box and said mouse body.

14. The slim mouse according to claim 13 wherein said battery box case further comprises an extension part, and said first protrusion further comprises a perforation, wherein a first terminal of said conducting wire is connected to said battery box, said conducting wire is penetrated through the extension part, and a second terminal of said conducting wire is stretched out of said perforation and connected to said mouse body, so that said battery box and said mouse body are electrically connected with each other.

15. The slim mouse according to claim 12 further comprising a wheel function module for providing a wheel function.

16. The slim mouse according to claim 12 wherein said wheel function module is an optical finger navigation module.

17. The slim mouse according to claim 12 further comprising a wireless signal emitter, which is disposed within said mouse body for generating a wireless signal.

18. The slim mouse according to claim 17 wherein a wireless signal receiver is connected to said computer for receiving said wireless signal from said wireless signal emitter, so that said slim mouse is communicated with said computer via said wireless signal.

19. The slim mouse according to claim 18 wherein said mouse body further comprises a receiver storing part for storing therein said wireless signal receiver.

20. The slim mouse according to claim 12 further comprising multiple buttons, which are disposed on said mouse body.

21. The slim mouse according to claim 12 further comprising a PCMCIA connecting part disposed at an end of said mouse body, wherein when said slim mouse is operated in said charging mode and said PCMCIA connecting part is connected to a PCMCIA slot of said computer, the electric energy of said computer is transmitted to said slim mouse through said PCMCIA connecting part so as to charge said battery.

22. The slim mouse according to claim 12 wherein said computer is a notebook computer.

* * * * *